UNITED STATES PATENT OFFICE.

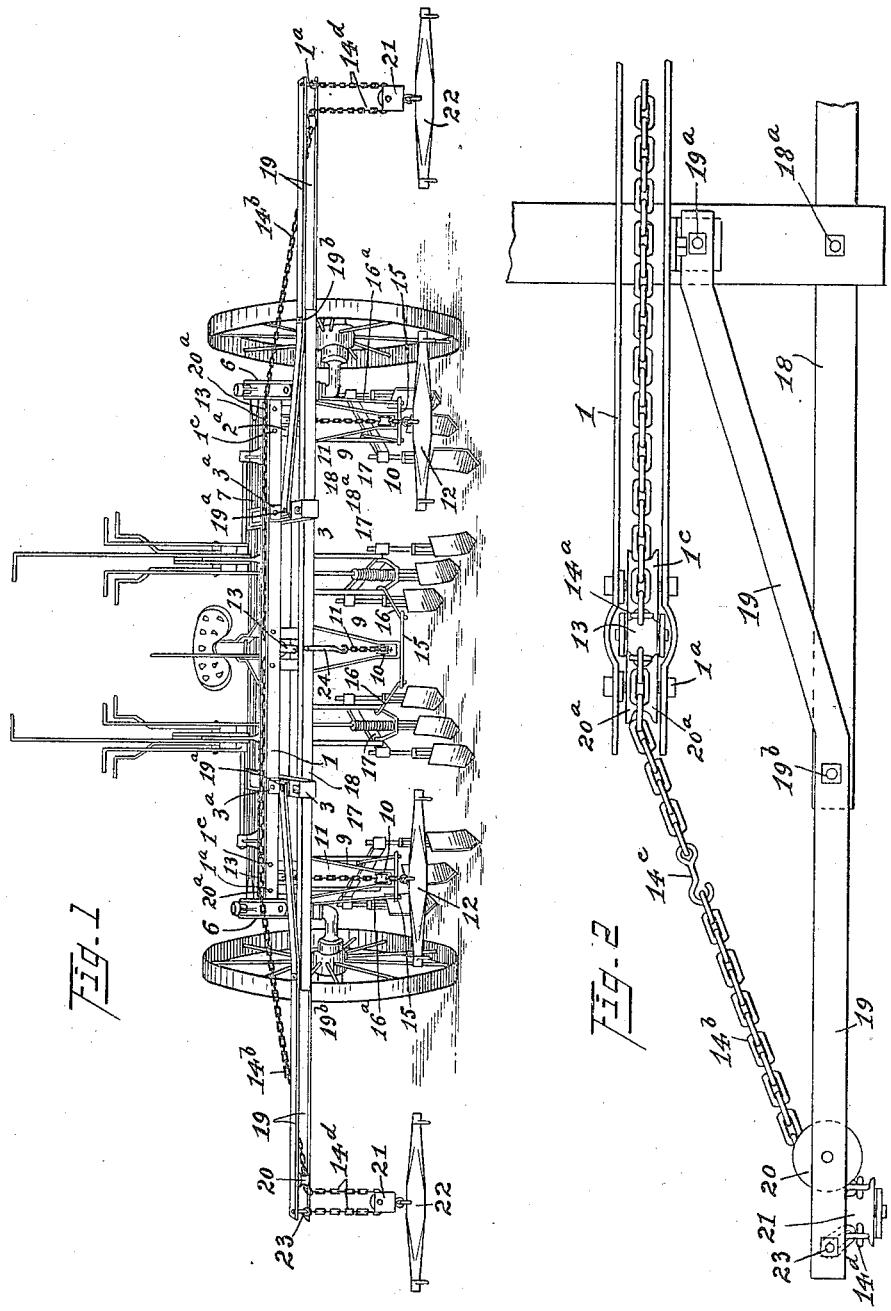

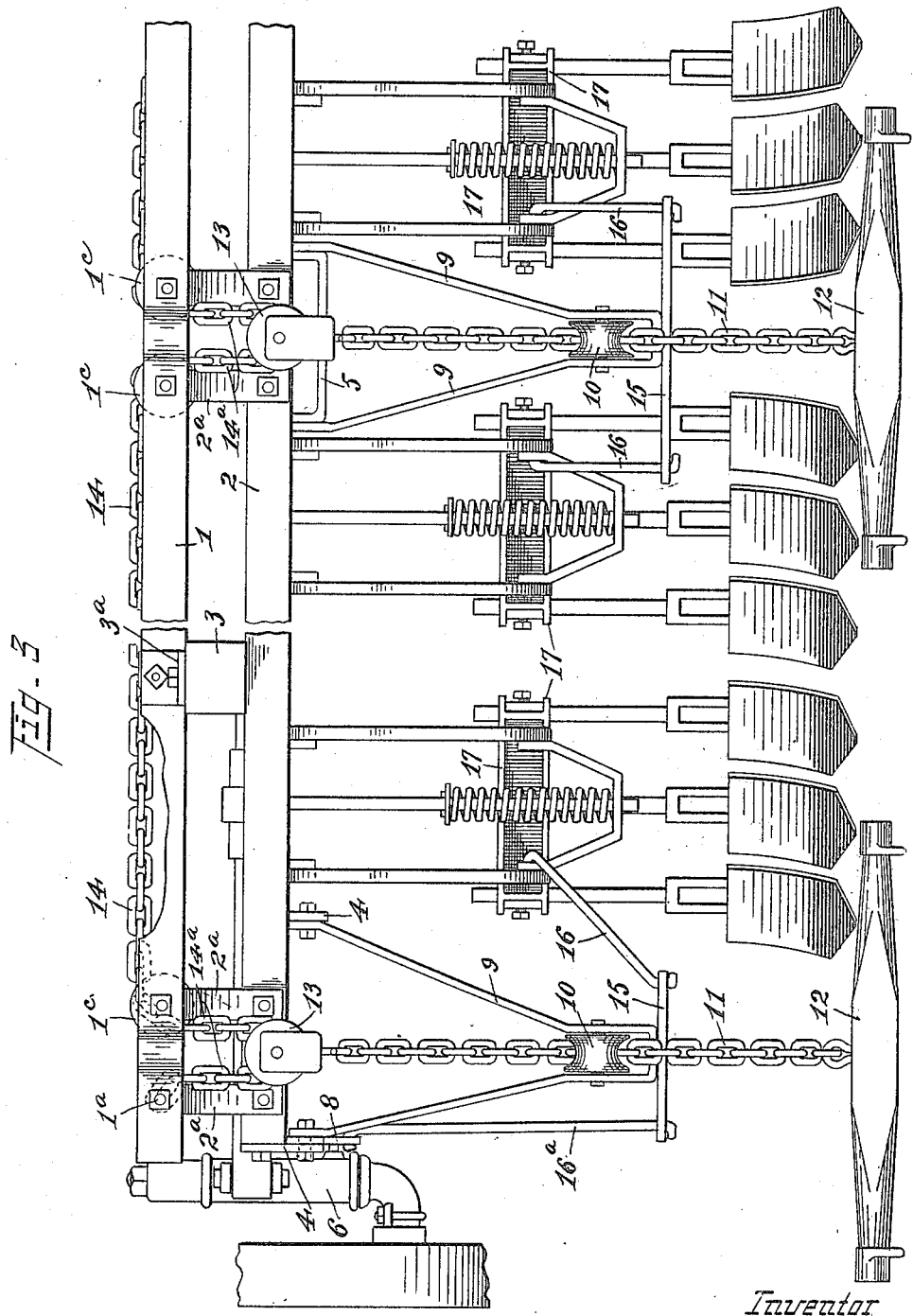

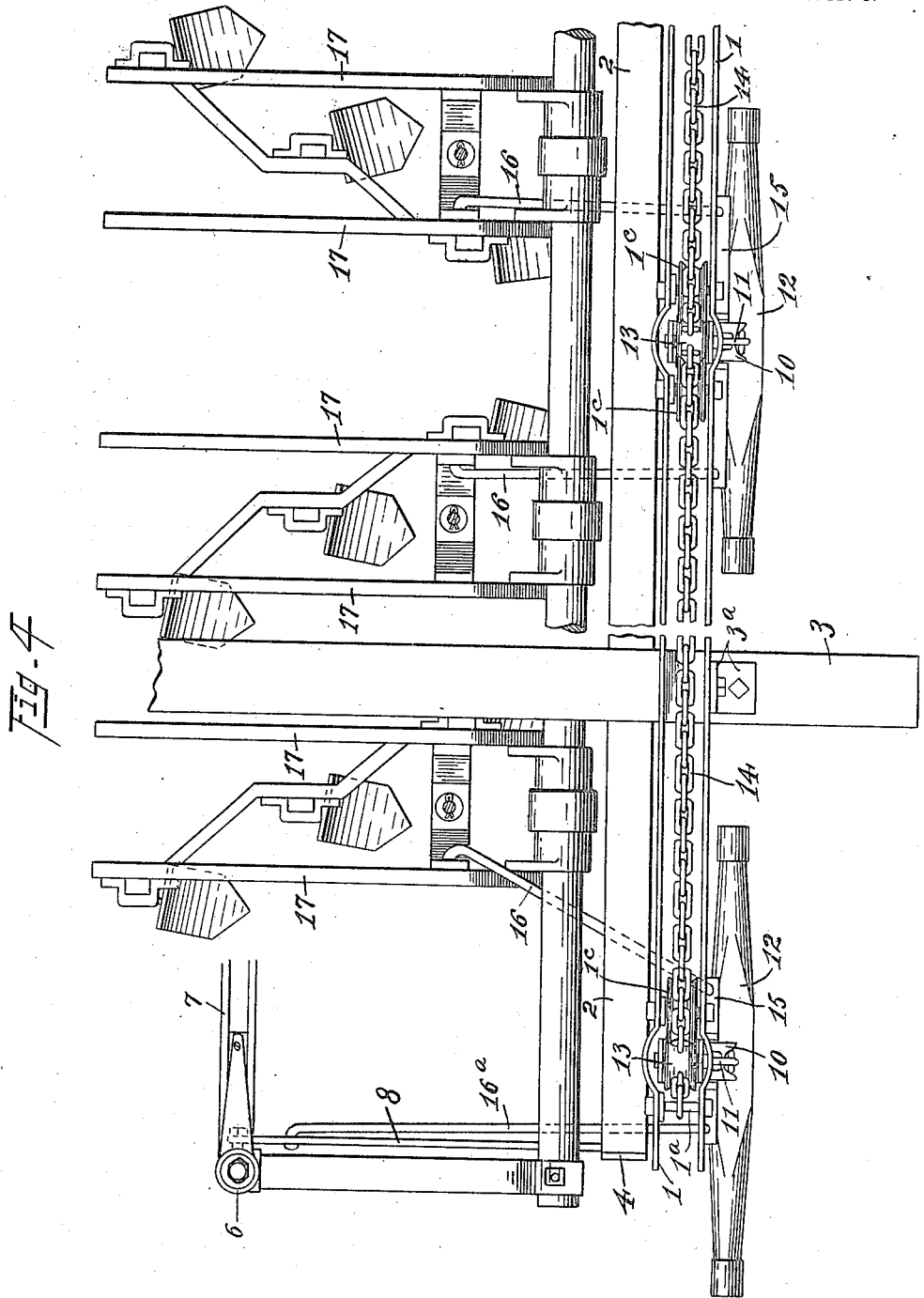

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

DRAFT-EQUALIZER.

1,239,147.           Specification of Letters Patent.      Patented Sept. 4, 1917.

Application filed November 30, 1915. Serial No. 64,228.

*To all whom it may concern:*

Be it known that I, FREDERICK C. WARNE, a citizen of the United States, residing at Mansfield, in the county of Richland and State of Ohio, have invented certain new and useful Improvements in Draft-Equalizers, of which the following is a specification.

My invention relates to improvements in draft equalizers, the primary object being to provide a generally improved equalizer or hitch for horse-drawn implements or vehicles, such as cultivators, or the like, where it is desirable to employ three, four or five draft animals.

For the purpose of illustration, I have applied my improved draft equalizer or hitch to a cultivator of the "two-row" type, the improved equalizer being particularly well adapted for use in connection with an implement of this class, being designed not only to apply the draft to the frame of the implement or vehicle, but to the gangs or drag bars as well so as to properly distribute and equalize the strains and tensions during the active or cultivating movements of the cultivator gangs or earth working implements.

In the present instance, I have shown the invention in its primary embodiment as comprising a three-horse equalizer which, by the addition of auxiliary or supplementary devices may be readily transformed or converted—for example,—into a four or five-horse equalizer.

The primary object of the invention is to provide a generally improved device of this class of exceedingly simple and efficient construction whereby a perfect equalization is obtained for a plurality of draft animals without the use of evener bars such as are employed in draft equalizers now in common use.

A further object of the invention is the provision of a cultivator equalizer adapted to counterbalance the natural tendency of the cultivator gangs or drag bars to throw a weight or draft on the neck of the draft animals through the cultivator poles.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1 is a front elevation of the improved draft equalizer applied to a cultivator of the "two-row" type, and equipped with the necessary end extensions or auxiliary devices for providing a four-horse hitch (or a five-horse hitch by the provision of a middle swingletree as hereinafter explained,)

Fig. 2, a fragmentary top plan view of one of the end extensions and illustrating the manner of attaching the latter to one of the poles and a supplementary transverse brace bar, Fig. 3, an enlarged fragmentary front elevation of the draft equalizer in its primary embodiment as a three-horse equalizer or hitch, the end extensions or supplementary devices being removed, and Fig. 4, an enlarged top plan view of the same.

Similar numerals of reference designate like parts throughout all the figures of the drawings.

The improved draft equalizer in the form of a three-horse draft equalizer or hitch is shown in my application for Letters Patent for improvements in two-row cultivators, filed May 27th, 1915, Serial No. 30,806, and of which this application is a continuation as to all the mechanical subject-matter common to the two applications.

The improved draft equalizer or hitch comprises a front transversely extending sheave or pulley carrying bar 1, and when attached to an implement or cultivator of the type herein shown, may be attached to the front transverse frame bar 2, by means of standards $2^a$, and to the poles 3, by means of angle members $3^a$. The transversely extending bars 1 and 2, connected by means of the connecting members $2^a$ and $3^a$, may be said to conjointly form a front transversely extending frame member to which the draft appliances hereinafter referred to are attached as now described in detail.

The front transverse frame member 1, may be provided at its ends with drop hitch extensions 4, and at its center with a drop hitch stirrup 5, the outer ends of the drop hitch extensions 4, being preferably connected to the axle sleeves 6, of the rear or axle member 7, of the cultivator by means of axle brace members 8.

The drop hitch extensions and stirrup members 4 and 5, are provided with depending pivotally mounted drop hitch or bracket members 9, each provided at the lower or free end with draft sheaves or pulleys 10, over which flexible draft or cable members 11, are adapted to pass, such draft cable members 11, being provided with swingletrees, the opposite ends of said draft cable members 11, being detachably connected to floating pulleys 13, the latter being carried in depending loops 14ª, of a longitudinally extending flexible equalizing cable 14, and when it is desired to use the device as a three-horse draft equalizer or hitch the outer ends of the flexible cable 14, forming the end loops are attached to the ends of the sheave carrying bar 1, through the medium of the bearing bolts 1ª, the intermediate or loop portions of the transversely extending equalizing cable being adapted to travel upon the sheaves 1ᶜ, carried by the transverse sheave carrying bar 1, and by reason of the construction above described it will be apparent that a perfect equalization of draft is obtained, since if one or more of the draft animals should fall back, the slack in the flexible equalizing cable is immediately taken up by the other or others, and thus all will be pulling the same load. It will thus be seen that the hitch members 9, are pivotally attached to the front of the frame of the vehicle and that although the drop hitch members 9, are attached to the front transverse frame bar 2, through the medium of the extensions 4 and 5, they are indirectly attached to the sheave carrying bar 1, and such parts might be readily attached directly to the sheave carrying bar in case of the elimination of the transverse frame bar 2.

The lower or loop ends of the pivotally mounted drop hitch or bracket members 9, are provided with transversely extending pivotally mounted draft equalizer bars 15, the outer free ends of said draft or equalizer bars 15, being connected to draft bars or rods 16, extending rearwardly, said bars or rods 16, being flexibly connected to the cultivator gang beams or drag bars 17, with the exception of the outer draft bars or rods 16ª, which, it will be seen, are connected to the axle brace members 8. By reason of the construction described, it will be seen that an improved equalizer or draft appliance is provided for three draft animals, and it will also be apparent that by reason of the connections between the gang beams or drag bars 17, and the movable drop hitches 9,— through the medium of the draft bars or rods 16 and 16ª, said drop hitch members 9, will be permitted to swing with any elevation and depression of the gang or drag bars 17, thus allowing of perfect application of draft to such drag bars at all times.

When it is desired to transform or adapt the device for use as a four-horse draft equalizer or hitch, a supplementary transverse or brace bar 18, is attached to the poles 3, in the present instance, beneath said poles and in front of the sheave carrying bar 1, through the medium of attaching bolts 18ª, and a pair of extension arms 19, are attached at their inner ends to the poles 3, through the medium of suitable attaching bolts 19ª, said arms 19, extending forwardly and outwardly and having their intermediate portions secured to and braced by the ends of the transverse bar 18, through the medium of attaching bolts 19ᵇ, the outer ends of said extension arms 19, being provided with horizontally disposed sheaves 20.

As a means of extending the flexible equalizing cable 14, the ends of the latter are removed from the bearing bolts 1ª, after which sheaves 20ª, are mounted on such bolts, the detached ends of said flexible equalizing cable passing over such sheaves 20ª, and outwardly, and being supplemented by means of flexible equalizing cable extensions 14ᵇ, and detachably attached to the latter by means of cable extension hooks 14ᶜ, the outer ends of said equalizing cable extensions 14ᵇ, passing over the sheaves 20, and forming loops 14ᵈ, the latter carrying pulleys 21, suitably attached to swingletrees 22, the ends of said loops 14ᵈ, or the outer ends of the cable extensions, being secured to the anchor portions 23, at the outer ends of the extension arms 19.

When in use as a four-horse draft equalizer, as shown in Fig. 1 of the drawings, it will be seen that the middle or intermediate swingletree 12, shown in Figs. 3 and 4, of the drawings is removed, the end of the middle or intermediate flexible draft cable member 11, being carried upwardly and secured to a depending anchor or stay hook 24, attached to the front of the transverse brace bar 18, and when it is desired to transform or adapt the device for use as a five-horse hitch the intermediate flexible draft cable member 11, is detached from the stay or anchor hook 24, and extended forwardly and attached to the restored middle or intermediate swingletree, as shown in Figs. 3 and 4 of the drawings.

From the foregoing description, taken in connection with the accompanying drawings, the operation and advantages of my invention will be readily understood.

Having thus described some of the embodiments of my invention, what I claim and desire to secure by Letters Patent, is,—

1. A draft equalizer, comprising a sheave carrying transverse bar, a plurality of depending flexibly connected drop hitch members, a flexible equalizing cable carried by said sheave carrying bar and provided with depending loops extending within said drop hitch members, sheaves carried by said drop hitch members, and floating pulleys carried in said depending loops and provided with draft cables extending over said sheaves in said drop hitch members.

2. In a draft equalizer, the combination with a cultivator frame provided with a transversely extending flexible equalizing cable having depending end and intermediate loops, and flexible draft appliances connected to said end and intermediate loops; of end equalizing cable and sheave carrying extensions detachably connected to said flexible equalizing cable and cultivator frame, respectively, said end equalizing cable extensions being provided with loops connected to said sheave carrying extensions and passing over the sheaves thereof.

3. In a draft hitch for cultivators, the combination with a cultivator frame provided at its front with a transversely extending sheave carrying bar and drop hitch members, and a flexible equalizing cable and draft cable members carried by said sheave carrying bar and drop hitch members, respectively, in coöperative relation to each other; of bar and equalizing cable extensions connected to said cultivator frame and equalizing cable respectively, said bar extensions being provided with sheaves and said cable extensions being secured to said bar extensions and provided with loops extending over said last mentioned sheaves.

4. A draft equalizer, comprising a transversely extending sheave carrying bar, pivotally mounted drop hitch members extending from the end and intermediate portions of said bar, a transversely extending flexible equalizing cable carried by said sheave carrying bar and provided with depending end and intermediate loops within said drop hitch members, sheaves mounted within the lower ends of said drop hitch members, and floating pulleys mounted in said depending loops and provided with draft cables extending over said sheaves in said drop hitch members.

5. In a convertible draft equalizer, a sheave carrying bar provided with a flexible equalizing cable provided with a plurality of depending loops, and a plurality of depending movable hitch members provided with sheaves below said depending loops, draft equalizer members carried by said drop hitch members, and floating pulleys mounted in said depending loops and provided with draft cables extending over said sheaves in said drop hitch members; of sheave and loop carrying bar and equalizer cable extensions detachably connected to the ends of said equalizer cable and sheave carrying bar in coöperative relation to the same.

6. A draft hitch and equalizer appliance, comprising a front transverse frame member provided with end and intermediate pivotally mounted depending drop hitch members, a transversely extending flexible draft cable carried by said front frame member and provided with depending end loops and an intermediate loop within said drop hitch members, pulleys on said front frame member for supporting said depending loops, pulleys mounted within the lower ends of said drop hitch members, and floating pulleys mounted in said depending loops and provided with draft cables extending over said pulleys in said drop hitch members.

7. A three-horse equalizer and draft appliance, comprising a front transversely extending frame member provided with a transversely extending flexible cable member secured at its ends and provided with intermediate depending loops, pulleys on said front frame member carrying said depending loops, drop hitch members pivotally connected to said front frame member below said loops and provided at their lower or free ends with draft pulleys, flexible draft cable members extending over the latter and provided with floating pulleys carried in said depending loops, and draft equalizing bars pivotally connected at the lower ends of said drop hitch members.

8. In a draft equalizer, the combination with a transversely extending sheave carrying bar provided with a flexible equalizing cable having end and intermediate loops, drop hitch members provided with sheaves, and floating pulleys mounted in said end and intermediate loops and provided with draft cables extending over said sheaves in said drop hitch members; of cable and bar extensions at the ends of said equalizing cable and sheave carrying bar, said bar extensions being provided with sheaves and said cable extensions being provided with end loops extending over said sheaves and coöperating with said loops of said first mentioned equalizing cable and said drop hitch members.

9. In a draft equalizer, a frame including a transversely extending sheave carrying bar and a flexible equalizing cable carried thereby and provided with depending loops, drop hitch members provided with draft equalizing bars and carrying sheaves below said depending loops, floating pulleys mounted in said depending loops and provided with draft cables extending over said sheaves of said drop hitch members, and end bar and cable extensions detachably connected to said frame and equalizing cable, respectively, said bar extensions being provided at their ends with sheaves and said cable extensions being provided with loops extending over said sheaves and secured at their ends to said bar extensions, and pulleys mounted in said last mentioned loops and provided with swingletrees.

10. In a draft equalizer for cultivators, a frame including a front transverse member and a rear transverse or axle member, said front transverse member being provided with depending pivotally mounted drop hitch members carrying pulleys and pivotally mounted draft equalizing bars, flexible cable members passing over said pulleys and provided with swingletrees at one end and floating pulleys at the other, pulleys carried by said front transverse frame member, a longitudinally extending flexible cable attached at its ends to the ends of said transverse frame member and provided with depending loops passing over said pulleys and said floating pulleys, cultivator gangs mounted at the rear of said drop hitches, and draft bars connected to the free ends of said draft equalizing bars and to said cultivator gangs.

11. In a draft appliance for cultivators, the combination with a suitable frame including a front transverse frame member carrying a transversely extending flexible draft cable member and provided with pulleys spaced apart to support a plurality of depending cable loops, pivotally mounted drop hitch members carried by said front transverse frame member and provided with draft pulleys below said loops, flexible draft cable members passing over said pulleys provided at their ends with swingletrees, floating pulleys mounted in said depending loops and connected to the opposite ends of said flexible draft cable members, horizontally extending draft equalizer bars pivotally connected to the lower ends of said drop hitch members, cultivator gangs suitably mounted at the rear of said drop hitch members, and draft rods extending from said cultivator gangs and connected to the outer or free end of said draft equalizer bars.

12. In a draft appliance for cultivators, the combination with a front transverse frame member and a rear transverse or axle frame member, including cultivator gangs, vertical axle sleeves carried by said axle frame member, pivot wheels and axles carried in said axle sleeves, drop hitch extensions at the ends of said front transverse frame member, axle brace members connected to said drop hitch extensions and said axle sleeves, a drop hitch stirrup carried by said front transverse frame member, drop hitch members pivotally connected to said drop hitch extensions and said stirrup, a flexible cable member carried by said front transverse frame member and provided with depending loops in coöperative relation to said drop hitch members, flexible cable members carried at the lower ends of said drop hitch members and provided with floating pulleys carried by said depending loops, transversely extending draft equalizer bars pivotally carried at the lower ends of said drop hitch members, draft rods carried by said equalizer bars and connected to said cultivator gangs, and draft rods extending from the outer ends of the outer draft equalizer bars to said axle brace members.

In testimony whereof I have affixed my signature in the presence of two witnesses.

FREDERICK C. WARNE.

Witnesses:
C. A. HINES,
N. P. HENRY, Jr.

Copies of this patent may be obtained for five cents each, by addressing the "Commissioner of Patents, Washington, D. C."